(12) United States Patent
Smith

(10) Patent No.: US 12,052,263 B2
(45) Date of Patent: Jul. 30, 2024

(54) SWITCHING IN PROGRESS INTER-PARTY COMMUNICATIONS BETWEEN CLIENTS

(71) Applicant: Zoom Video Communications, Inc., San Jose, CA (US)

(72) Inventor: Jeffrey William Smith, Milpitas, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 320 days.

(21) Appl. No.: 17/492,883

(22) Filed: Oct. 4, 2021

(65) Prior Publication Data
US 2022/0239663 A1 Jul. 28, 2022

Related U.S. Application Data

(63) Continuation of application No. 17/161,519, filed on Jan. 28, 2021, now Pat. No. 11,165,789.

(51) Int. Cl.
| | |
|---|---|
| *H04L 29/06* | (2006.01) |
| *G06F 9/54* | (2006.01) |
| *H04L 9/40* | (2022.01) |
| *H04L 67/01* | (2022.01) |
| *H04L 67/1021* | (2022.01) |
| *H04N 7/15* | (2006.01) |

(52) U.S. Cl.
CPC ............ *H04L 63/107* (2013.01); *G06F 9/542* (2013.01); *H04L 63/0876* (2013.01); *H04L 67/01* (2022.05); *H04L 67/1021* (2013.01)

(58) Field of Classification Search
CPC .................. H04L 63/107; H04L 67/01; H04L 63/0876; H04L 67/1021; H04L 29/06; H04L 29/08; H04L 67/24; G06F 9/542; H04N 7/15

USPC ......................................................... 709/203
See application file for complete search history.

(56) References Cited

U.S. PATENT DOCUMENTS

| | | | |
|---|---|---|---|
| 5,805,823 A | 9/1998 | Seitz | |
| 6,195,545 B1 | 2/2001 | Baker et al. | |
| 7,974,270 B2 * | 7/2011 | Goel ..................... | H04W 92/18 |
| | | | 370/338 |
| 8,208,913 B2 | 6/2012 | Allen et al. | |
| 8,326,276 B2 | 12/2012 | Chin et al. | |
| 9,125,144 B1 | 9/2015 | Orbach et al. | |
| 9,172,813 B2 | 10/2015 | Kannan | |
| 9,876,857 B2 * | 1/2018 | Kim ....................... | H04L 67/12 |

(Continued)

OTHER PUBLICATIONS

International Search Report and Written Opinion mailed on May 4, 2022 in corresponding PCT Application No. PCT/US2022/014129.

*Primary Examiner* — Jude Jean Gilles
(74) *Attorney, Agent, or Firm* — Young Basile Hanlon & MacFarlane, P.C.

(57) ABSTRACT

Inter-party communications, such as telephony communications, virtual meeting communications, or messaging communications, are switched between clients while in progress. An inter-party communication may be detected at a first client. A channel may then be opened between the first client and a second client responsive to an operator initiating switching the inter-party communication from the first client to the second client. The inter-party communication may be switched from the first client to the second client using the channel while the inter-party communication remains in progress. The inter-party communication may then be continued at the second client.

18 Claims, 8 Drawing Sheets

(56) References Cited

U.S. PATENT DOCUMENTS

| | | | |
|---|---|---|---|
| 10,834,147 B1* | 11/2020 | Wehrung | H04L 67/025 |
| 2002/0114319 A1* | 8/2002 | Liu | H04M 7/006 |
| | | | 370/352 |
| 2002/0154242 A1 | 10/2002 | Robins et al. | |
| 2004/0076121 A1* | 4/2004 | Yang | H04L 61/00 |
| | | | 370/392 |
| 2008/0271126 A1 | 10/2008 | Saraf et al. | |
| 2009/0129273 A1* | 5/2009 | Zou | H04W 36/06 |
| | | | 370/235 |
| 2010/0217809 A1* | 8/2010 | Vymenets | G06Q 10/10 |
| | | | 709/206 |
| 2014/0267578 A1* | 9/2014 | Rowe | H04N 21/43615 |
| | | | 348/14.11 |
| 2015/0029299 A1* | 1/2015 | Choi | H04L 12/1822 |
| | | | 348/14.08 |
| 2017/0118666 A1 | 4/2017 | Patel et al. | |
| 2017/0331946 A1* | 11/2017 | Mumick | H04M 15/08 |
| 2017/0353397 A1 | 12/2017 | Che | |
| 2017/0353452 A1* | 12/2017 | Wang | H04M 15/882 |
| 2018/0103151 A1* | 4/2018 | Erm | H04M 7/1225 |
| 2018/0176005 A1* | 6/2018 | Bockrath | H04L 69/085 |
| 2018/0176270 A1 | 6/2018 | Griffin et al. | |
| 2019/0217191 A1 | 7/2019 | Colenbrander | |
| 2019/0251538 A1 | 8/2019 | Grosh et al. | |
| 2019/0320019 A1* | 10/2019 | Hamrick, Jr. | H04L 67/10 |
| 2020/0004854 A1 | 1/2020 | Inturi et al. | |
| 2020/0327169 A1 | 10/2020 | Lewis et al. | |

\* cited by examiner

SWITCHING IN PROGRESS INTER-PARTY COMMUNICATIONS BETWEEN CLIENTS

CROSS-REFERENCE TO RELATED APPLICATION(S)

This disclosure is a continuation of U.S. application Ser. No. 17/161,519, filed on Jan. 28, 2021, the entire disclosure of which is herein incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for application interaction movement between clients.

One aspect of this disclosure is a method, which includes detecting an inter-party communication at a first client, opening a channel between the first client and a second client responsive to an operator initiating switching the inter-party communication from the first client to the second client, switching the inter-party communication from the first client to the second client using the channel while the inter-party communication remains in progress, and continuing the inter-party communication at the second client.

Another aspect of this disclosure is a non-transitory computer readable medium storing instructions operable to cause one or more processors to perform operations, which include detecting an inter-party communication at a first client, opening a channel between the first client and a second client responsive to an operator initiating switching the inter-party communication from the first client to the second client, switching the inter-party communication from the first client to the second client using the channel while the inter-party communication remains in progress, and continuing the inter-party communication at the second client.

Yet another aspect of this disclose is a system, which includes a server running software configured to detect an inter-party communication at a first client, open a channel between the first client and a second client responsive to an operator initiating switching the inter-party communication from the first client to the second client, switch the inter-party communication from the first client to the second client using the channel while the inter-party communication remains in progress, and continue the inter-party communication at the second client.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A software platform may include multiple software applications usable for different types of interactions. For example, a UCaaS platform may include one software application for video or audio meetings, another for email messaging, another for chat or instant messaging, and so on. A user of the software platform may have multiple clients which may be usable to access one or more of those software applications. For example, the user may use some combination of a desk phone, a mobile device, and a computer, in which functionality of one or more software applications of the software platform is accessible at some combination of those clients. However, when the user starts an interaction through a software application at one client and wants to move it to another client (e.g., because the user is moving to a new location or for other reasons), limitations of a typical software platform require the user to log into the software application at the other client to restart the interaction at that other client. This process can be disruptive to the interaction, such as by delaying the interaction while the user logs back into the software application.

Implementations of this disclosure address problems such as these using software for switching an application-based interaction between clients. An application-based interaction initiated at a first client for which use by an operator is pre-authenticated is detected. An indication of the application-based interaction is signaled to one or more other clients for which use by the operator is pre-authenticated. A determination is made to switch the application-based interaction to a second client of those other clients. The application-based interaction is switched from the first client to the second client while the application-based interaction remains in progress, such as using a communication channel opened between the first client and the second client. The operator may then continue and eventually terminate the application-based interaction at the second client.

Figure 1:
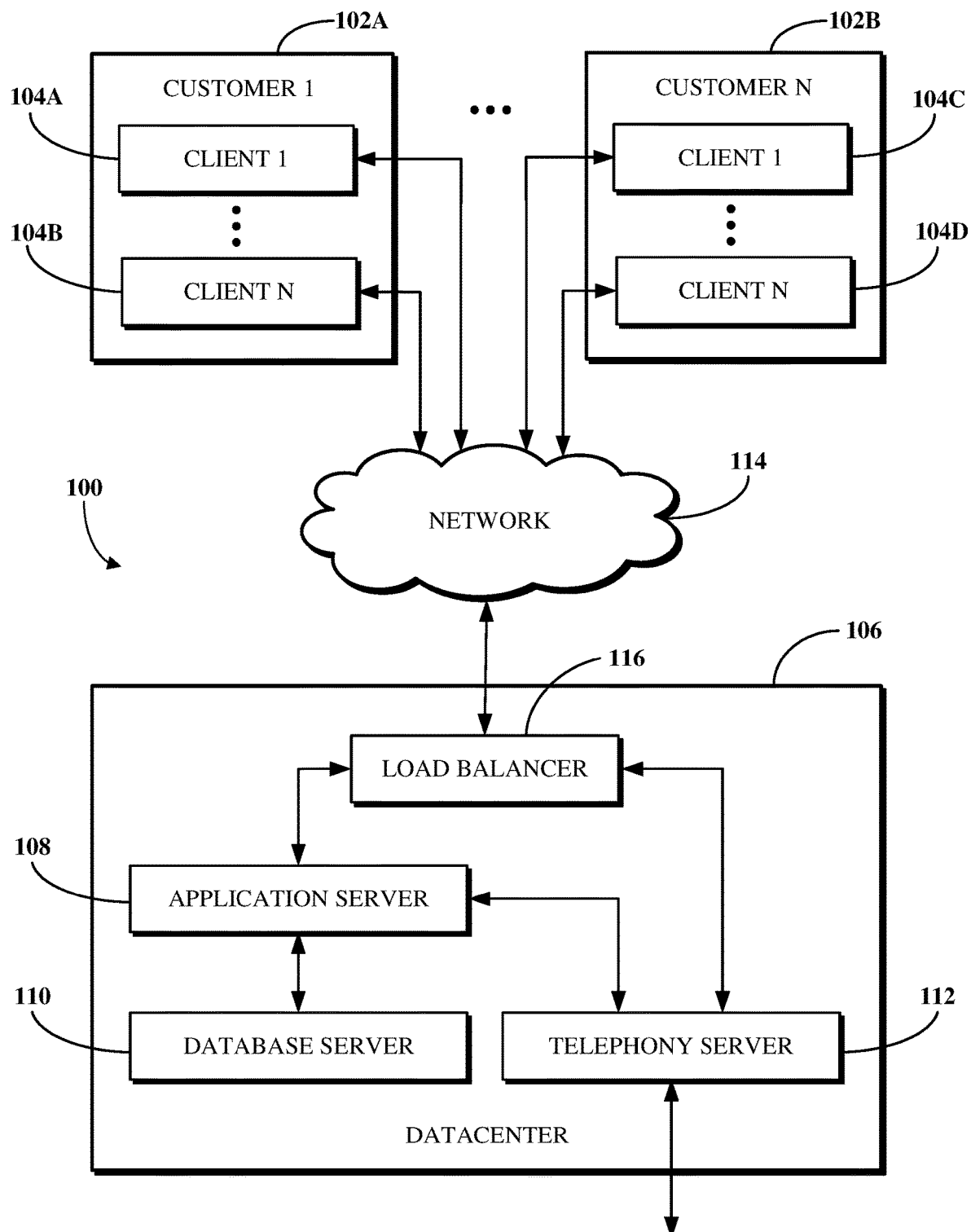
FIG. 1 is a block diagram of an example of an electronic computing and communications system.

To describe some implementations in greater detail, reference is first made to examples of hardware and software structures used to implement application interaction movement between clients. FIG. 1 is a block diagram of an example of an electronic computing and communications system 100, which, for example, can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
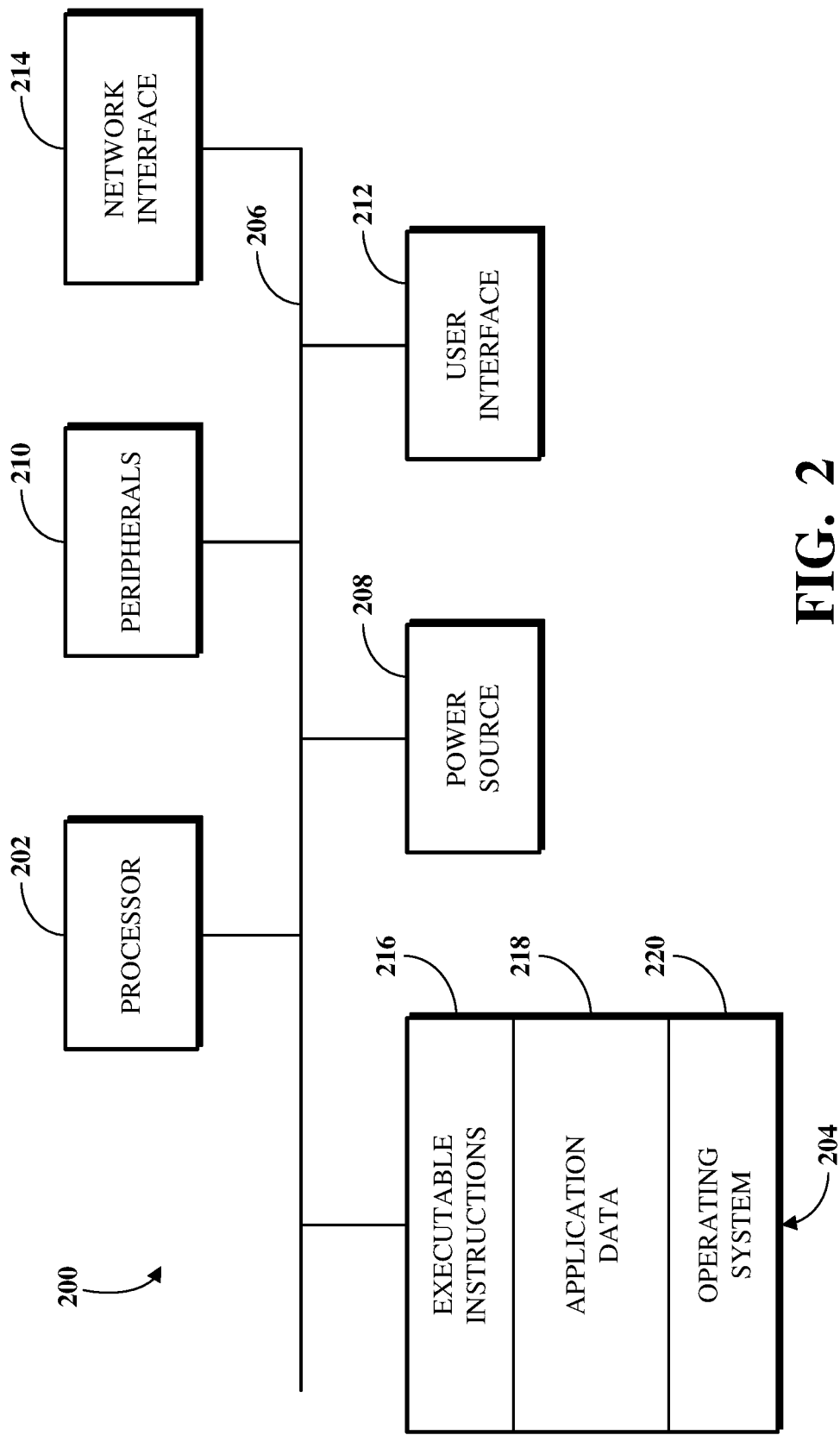
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the PBX server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
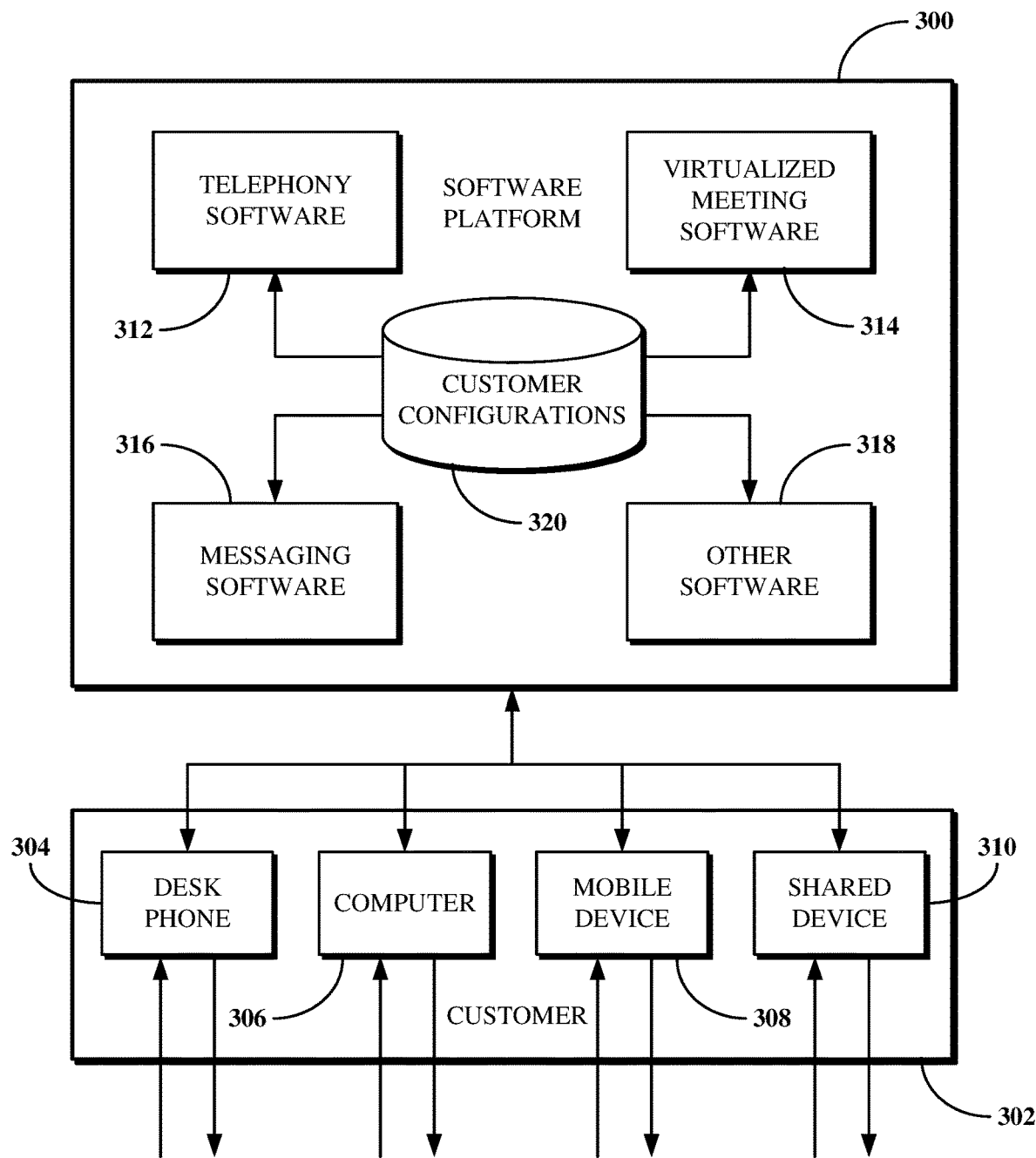
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the PBX server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, virtualized meeting software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. For example, the telephony software 312 may be implemented using one or more both of an application server and a PBX server, such as the application server 108 and the PBX server 112 shown in FIG. 1. Calls sent or received using the telephony software 312 may, for example, be sent or received using the desk phone 304, a softphone running on the computer 306, a mobile application running on the mobile device 308, or using the shared device 310 where same includes telephony features.

The virtualized meeting software 314 enables audio, video, and/or other forms of virtualized meetings between multiple devices, such as to facilitate a conference between the users of those devices. The virtualized meeting software 314 can include functionality for hosting, presenting scheduling, joining, or otherwise participating in a virtualized meeting. The virtualized meeting software 314 may further include functionality for recording some or all of a virtualized meeting and/or documenting a transcript for the virtualized meeting.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include application interaction movement software for switching an application-based interaction between clients, for example, ones of the clients 304 through 310. For example, the application interaction movement software may include functionality for detecting that an application-based interaction is initiated at a first client, signaling an indication of the application-based interaction to one or more second clients, and switching the application-based interaction to one such second client.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a virtualized meeting. In yet another example, the virtualized meeting software 314 may include functionality for sending and receiving instant messages between participants and/or other users of the customer 302. In yet another example, the virtualized meeting software 314 may include functionality for file sharing between participants and/or other users of the customer 302. In some implementations, some or all of the software 312 through 318 may be combined into a single software application run on clients of the customer, such as one or more of the clients 304-310.

Figure 4:
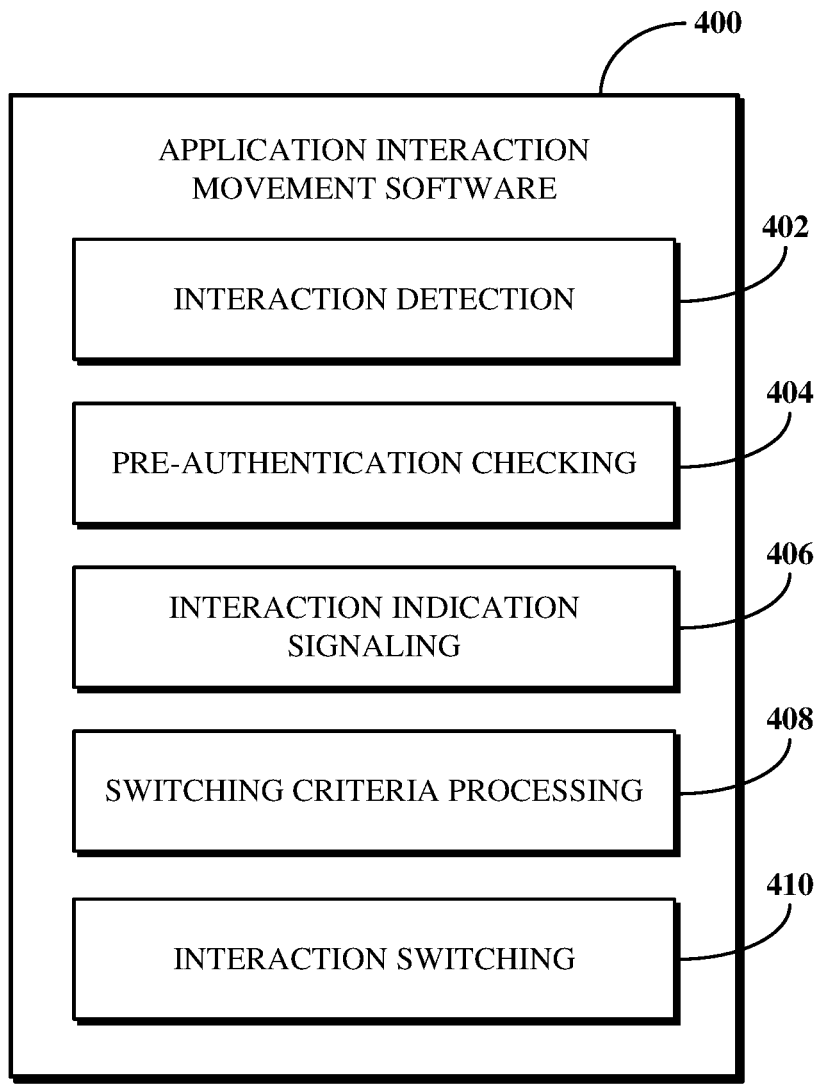
FIG. 4 is a block diagram showing example functionality of application interaction movement software of a software platform.

FIG. 4 is a block diagram showing example functionality of application interaction movement software 400 of a software platform, which may, for example, be the software platform 300 shown in FIG. 3. For example, the application interaction movement software 400 may be the application interaction movement software described above with respect to the other software 318. The application interaction movement software 400 includes tools for detecting, signaling, and switching an application-based interaction. As shown, the application interaction movement software 400 includes an interaction detection tool 402, a pre-authentication checking tool 404, an interaction indication signaling tool 406, a switching criteria processing tool 408, and an interaction switching tool 410.

The interaction detection tool 402 detects that an application-based interaction has been initiated at a client. The application-based interaction is, includes, or otherwise refers to an interaction by an operator of the client with a software application of the software platform. In particular, the interaction is one or more of a phone call, an audio meeting, a video meeting, a chat conversation, or another communication-based interaction enabled by one or more of the software 312 through 318 shown in FIG. 3. For example, an application-based interaction may be a video meeting implemented by the virtualized meeting software 314 between some number of participants including the operator of the client. The operator may, for example, be a human user of the first client, a software intelligence unit configured to use the first client, or another entity configured for client operation.

Because the application interaction movement software 400 is software of the software platform that also includes the software application used for the application-based interaction, the application interaction movement software 400, via the software platform, has visibility into interactions initiated at various software applications of the software platform. Thus, the interaction detection tool 402 may detect the initiation of the application-based interaction based on an event message received at the software platform from the software application used for the application-based interaction.

In some implementations, one or more software applications of the software platform may be configured to directly signal an application-based interaction to the application interaction movement software 400. In such an implementation, the interaction detection tool 402 may detect that an application-based interaction is initiated based on such a signal.

The pre-authentication checking tool 404 checks to determine whether the use of one or more clients by an operator is pre-authenticated. The use of a client by an operator is pre-authenticated where the operator, before the application-based interaction is initiated, completed an authentication operation for the client. The authentication operation may, for example, including the operator logging into the client at the client or another client or device usable to remotely connect to the client. For example, logging into the client can include the operator inputting some form of credentials for accessing one or more software applications at and/or other features or functionality of the client.

In some implementations, the pre-authentication checking tool 404 may determine whether the use of a client by an operator is pre-authenticated by searching through pre-authentication records stored in a database associated with the software platform. For example, the pre-authentication records may be some form of data which indicates that an operator is allowed to use one or more clients. The pre-authentication checking tool 404 may search through the pre-authentication records based on an identifier or other information associated with the operator. In some such implementations, a single pre-authentication record may correspond to each of the clients for which use by a given operator is pre-authenticated. In other such implementations, each individual pre-authentication record may correspond to a client for which use by one or more operators is pre-authenticated.

The interaction indication signaling tool 406 signals an indication of an application-based interaction detected at a client to one or more other clients, for example, by the interaction detection tool 402. In particular, the client at which the application-based interaction is detected is pre-authorized for use by an operator, and the one or more other clients to which the indication of the application-based interaction are signaled are also pre-authorized for use by the same operator. For example, the signaling can be based on information about client pre-authorization determined by the pre-authentication checking tool 404. Signaling the indication of the application-based interaction to a client can include pushing an event message representative of the application-based interaction to one or more of those other clients for which use by the operator is pre-authorized. The event message includes information usable to indicate the application-based interaction to a client which receives it.

The switching criteria processing tool 408 determines whether to switch the application-based interaction from a current client, that is, a client at which the application-based interaction is currently in progress, to a different client, such as one of the clients to which the indication of the application-based interaction is signaled. To determine whether to switch the application-based interaction, the switching criteria processing tool 408 considers one or more switching criteria, which may, for example, correspond to one or more of a detection of the operator within a geofence associated with the second client, a verification by the operator to switch the application-based interaction to the second client, or another criterion.

For example, software, which may be the application interaction movement software 400, the software application implementing the application-based interaction, or another software aspect of the software platform, may output a graphical user interface (GUI) to the current client to enable the operator thereof to verify the switching of the application-based interaction to a selected or otherwise identified other client. In another example, the operator of the current client may be detected within a geofence associated with the client to which the application-based interaction will be switched, for example, using ultrasonic ranging functionality of that client. In yet another example, the operator of the current client may be detected within a location associated with the client to which the application-based interaction will be switched, for example, based on a map of the location.

The interaction switching tool 410 switches the application-based interaction from one client to another, for example, based on the respective operations performed by the tools 402 through 408. In particular, the interaction switching tool 410 opens a communication channel between a first client, as the client on which the application-based interaction was initiated or on which the application-based interaction is otherwise currently in progress, and a second client, as the client to which the application-based interaction is to be switched. The communication channel is some connection usable to transmit information associated with the application-based interaction over a network, for example, the network 114 shown in FIG. 1. The communication channel may be a direct connection between the first client and the second client. Alternatively, the communication channel may use the application interaction movement software 400 or the software platform as an intermediary.

Once the communication channel is opened, the interaction switching tool 410 causes an importing of information associated with the application-based interaction from the first client to the second client, either directly or through an intermediary (e.g., the application interaction movement software 400 or the software platform). The imported information includes information usable by the second client to continue the application-based interaction at the second client. For example, the imported information may identify a software application which implements the application-based interaction, instructions for launching that software application at the second client, contents of the application-based interaction, or other information.

Although the tools 402 through 410 are shown as functionality of the application interaction movement software 400 as a single piece of software, in some implementations, some or all of the tools 402 through 410 may exist outside of the application interaction movement software 400 and/or the software platform may exclude the application interaction movement software 400 while still including the tools 402 through 410 elsewhere.

Figure 5:
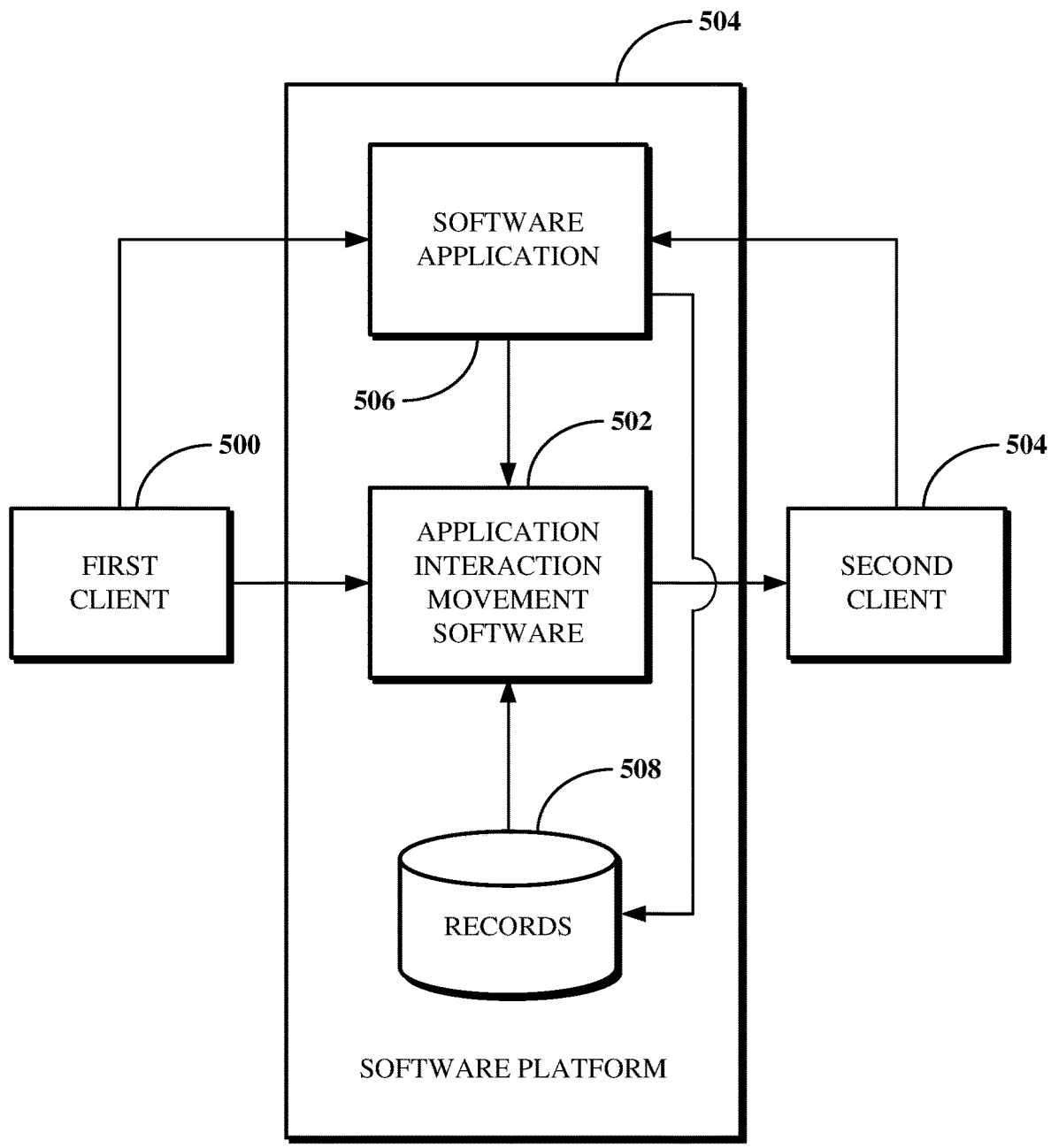
FIG. 5 is a block diagram showing an example flow for switching an application-based interaction between clients.

FIG. 5 is a block diagram showing an example flow for switching an application-based interaction between clients. In particular, as shown, an application-based interaction is switched from a first client 500 via application interaction movement software 502 to a second client 504. Each of the first client 500 and the second client 504 may, for example, be one of the clients 304 through 310 or another client. The application interaction movement software 502 may, for example, be the application interaction movement software 400 shown in FIG. 4 or other software. The application interaction movement software 502 is software of a software platform 504, which may, for example, be the software platform 300 shown in FIG. 3. The software platform 504 also includes application software 506 for implementing an application-based interaction and a database 508 storing records.

An operator of the first client 500 initiates an application-based interaction through the software application 506, which may, for example, be one of the software applications 312 through 318 shown in FIG. 3. The application-based interaction may be between the operator at the first client 500 and one or more other operators of other clients or devices. In particular, the first client 500 may be associated with a first customer of the software platform 504, and the other clients or devices may be associated with the first customer, a different customer of the software platform 504, or a different person or entity. The operator is pre-authenticated to use the first client 500, such that use of the first client 500 by the operator was authenticated before the application-based interaction was initiated.

The operator is pre-authenticated for one or more other clients, including the second client 504. In particular, upon the application interaction movement software 502 detecting the application-based interaction at the first client 500, the application interaction movement software 502 searches through the records stored in the database 508 to identify one or more other clients for which use by the operator is pre-authenticated. Responsive to the search, the application interaction movement software 502 signals to each such pre-authenticated client an indication of the application-based interaction, for example, in the form of an event message pushed to those pre-authenticated clients or in another form. The indication of the application-based interaction configures the clients which receive the indication to be able to continue the application-based interaction in the event the application-based interaction is switched to one of them from the first client 500.

At some point while the application-based interaction is in progress at the first client 500, the application interaction movement software 502 determines to switch the application-based interaction from the first client 500 to the second client 504. For example, the determination to switch the application-based interaction may be based on the operator indicating to switch the application-based interaction to the second client 504 (e.g., via a GUI output to a display of the first client 500). In another example, the determination to switch the application-based interaction may be based on a detection of the operator within a geofence associated with the second client 504. In yet another example, the determination to switch the application-based interaction may be based on a detection of the operator within a location associated with the second client 504, for example, based on a map of the location.

After the determination to switch the application-based interaction from the first client 500 to the second client 504 is made, the application interaction movement software 502 or another software associated with the software platform 504 opens a communication channel between the first client 500 and the second client 504. Information associated with the application-based interaction is imported from the first client 500 to the second client 504. The application-based interaction may then be continued at the second client through the software application 506 until such a time that the application-based interaction is terminated or switched to another client (e.g., back to the first client 500 or to another client).

Figure 6:
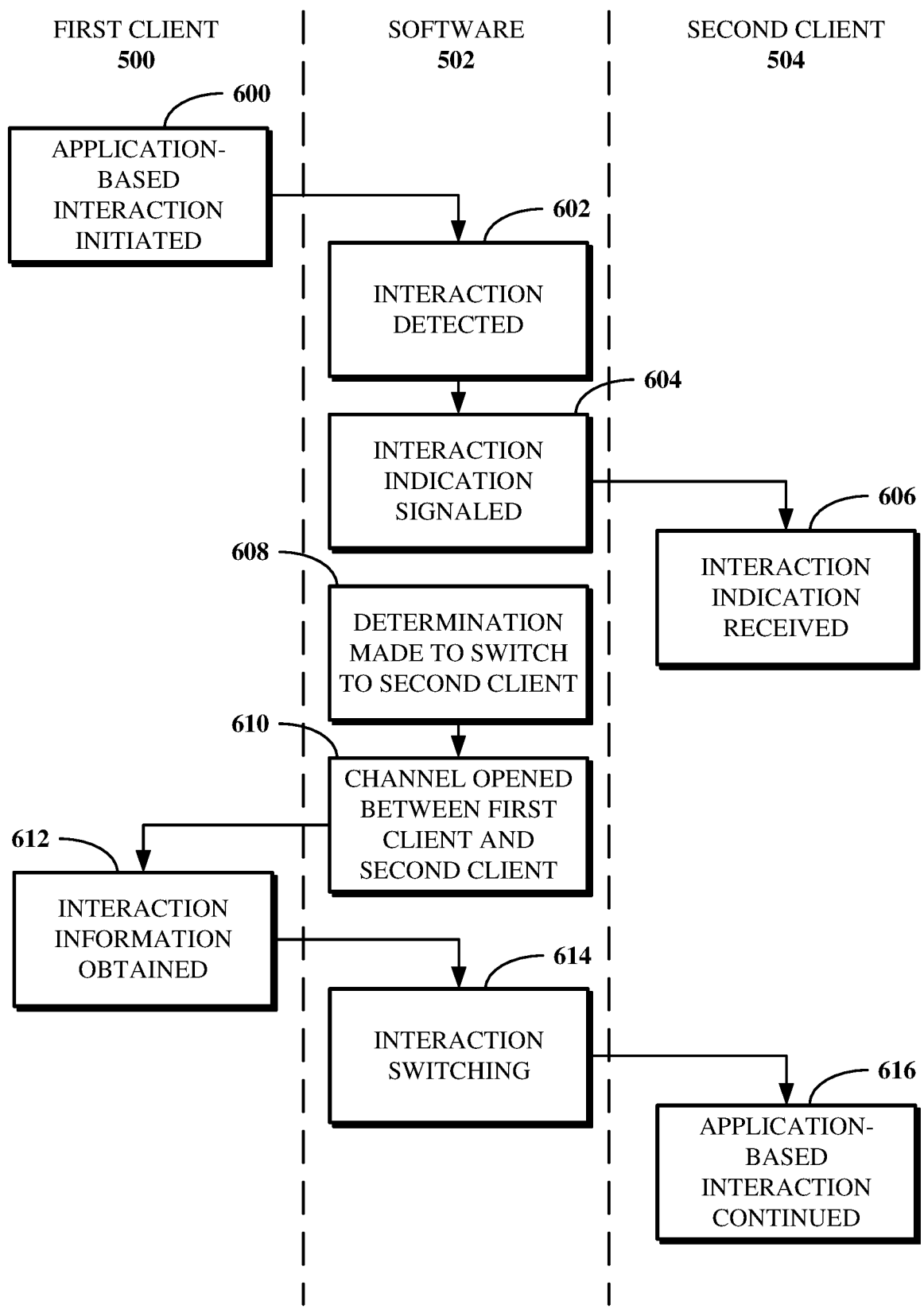
FIG. 6 is an illustration of swim lanes showing an example sequence of operations performed for application interaction movement between clients.

FIG. 6 is an illustration of swim lanes showing an example sequence of operations performed for application interaction movement between clients, in particular, from the first client 500 through the application interaction movement software 502 to the second client 504 as those are shown in FIG. 5. At 600, an application-based interaction is initiated at the first client 500. At 602, the application interaction movement software 502 detects the application-based interaction. At 604, the application interaction movement software 502 signals an indication of the application-based interaction to the second client 504, which the second client 504 receives at 606. At 608, the application interaction movement software 502, at some point during the application-based interaction, determines to switch the application-based interaction from the first client 500 to the second client 504. At 610, the application interaction movement software 502 opens a communication channel between the first client 500 and the second client 504. At 612, information associated with the application-based interaction is obtained from the first client 500. At 614, the application-based interaction is switched via the application interaction movement software 502 from the first client 500 to the second client 504 using the communication channel. At 616, the application-based interaction is continued at the second client 504.

Figure 7:
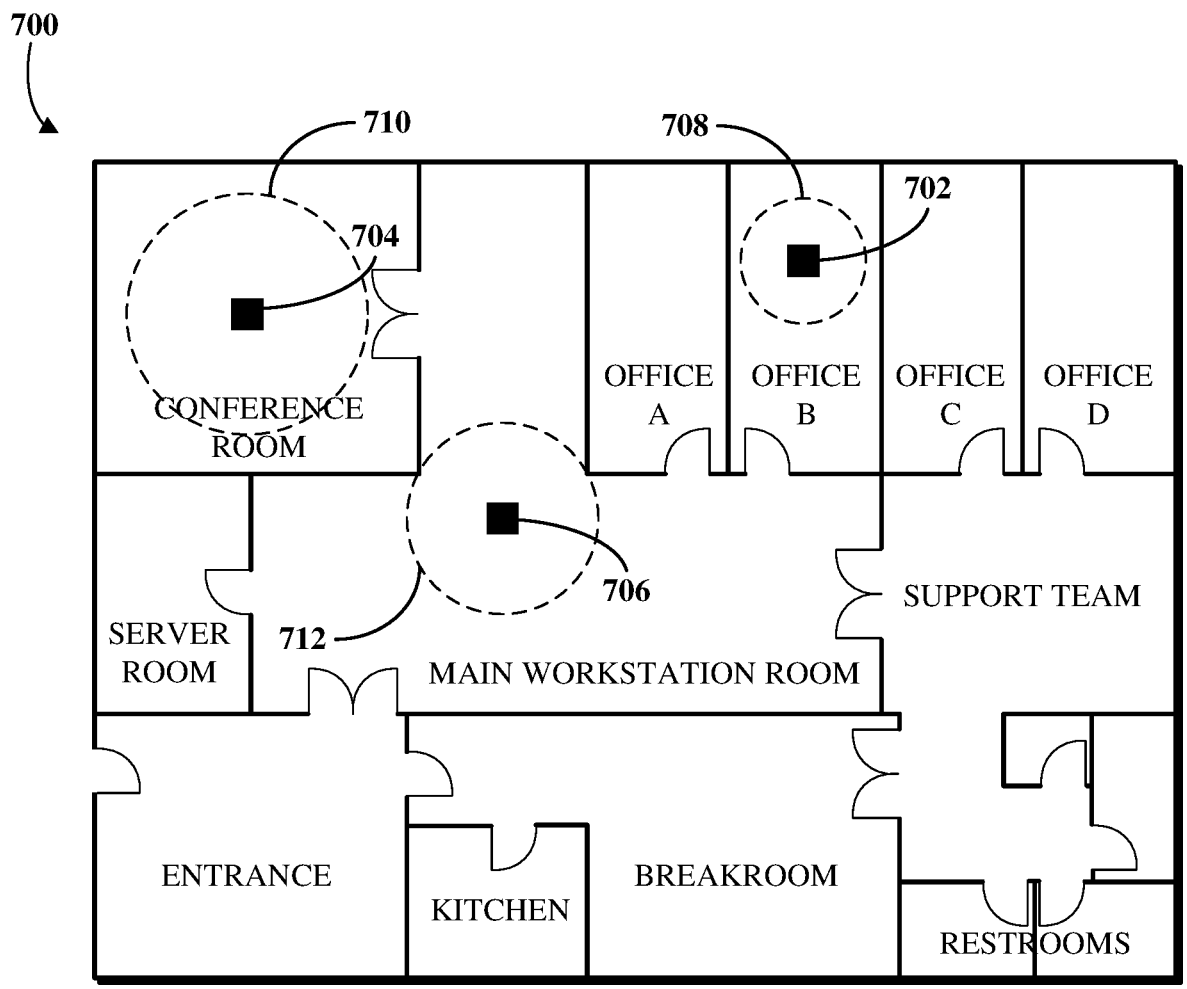
FIG. 7 is an illustration of an example map of a location of one or more clients.

FIG. 7 is an illustration of an example map 700 of a location of one or more clients. The map 700 may, for example, a map of a premises of a customer. The map 700 shows a layout of a premises of a customer of the software platform, for example, the customer 302 of the software platform 300 shown in FIG. 3. As shown, the premises includes a conference room, four offices, a server room, a kitchen, a breakroom, an entrance area, a main workspace room, a support room, restrooms, and some other small areas. The map 700 may be generated, received, or otherwise obtained by the software platform. For example, the map 700 may be manually drawn (e.g., by an operator of the software platform or another human or software aspect) or automatically generated thereby, such as using some set of input information (e.g., dimensional information) associated with the subject location.

As shown by example, three clients 702, 704, and 706 are located at the premises represented by the map 700, in which the client 702 is located in Office B, the client 704 is located in the conference room, and the client 706 is located in the main workstation room. Each of the three clients 702 through 706 may be one of the clients 304 through 310 shown in FIG. 3. For example, and without limitation, the client 702 may be a desk phone, the client 704 may be a shared device, and the client 706 may be a computer. The location of a client 702 through 706 within the premises may be defined within the map 700. For example, metadata associated with certain portions of the map 700 may be stored to indicate one or more clients located within those portions. Alternatively, the location of a client 702 through 706 may be indicated in a list, table, or other record or data store separate from the map 700, but which can be processed in connection with the map 700 to identify those locations.

Some or all clients of a customer may also be associated with a geofence. For example, as illustrated in the map 700, the client 702 is associated with the geofence 708, the client 704 is associated with the geofence 710, and the client 706 is associated with the geofence 712. Each of the geofences 708 through 712 represents a defined area about a location of the respective client 702 through 706. The defined area of a geofence 708 through 712 may be based on a location within the map 700 (e.g., Office B, conference room, main workstation room, etc.) or otherwise defined for the premises. For example, some or all of the geofences 708 through 712 may be defined based on the rooms in which the corresponding clients are located at the premises. Alternatively, the defined area of a geofence 708 through 712 may be based on an ultrasonic range of a corresponding client. For example, the client may include an ultrasonic sensor configured to measure ultrasonic signals up to a certain distance away from the client. The ultrasonic range of the client may thus represent an area around the client based on that distance.

The locations of the clients 702 through 706 and the geofences 708 through 712 may be used by software for switching an application-based interaction from one of the clients to another, for example, the application interaction movement software 400 shown in FIG. 4. For example, an operator of a first client, for example, the client 702, described above as a desk phone in the room labeled Office B in the map 700, may initiate an application-based interaction, for example, an audio or video meeting, at the client 702 using virtualized meeting software of a software platform, for example, the virtualized meeting software 314 shown in FIG. 3. During the audio or video meeting, the operator may decide that the meeting should be continued on a shared device, such as the client 704 located in the room labeled conference room in the map 700. The software detects when the operator has left the geofence 708 and entered the geofence 710, for example, based on an ultrasonic signal associated with a mobile device of the operator no longer being detected by the client 702 and becoming detected by the client 704. The software thus switches the audio or video meeting from the client 702 to the client 704.

In another example, the client 702 may be a mobile device of the operator, and the operator may decide that the meeting should be continued on a computer, such as the client 706 located in the room labeled main workspace room in the map 700. The software for switching the application-based interaction may detect that the operator has entered the geofence 712 based on an ultrasonic sensor of the client 706 detecting an ultrasonic signal from the client 702 once the client moves the client 702 into the geofence 712. Alternatively, the software for switching the application-based interaction may use some form of geolocation or triangulation service to detect that the operator has entered the main workstation room in which the client 706, for which the operator is pre-authenticated, is located. Other examples for detecting an operator in a portion of the premises based on information associated with a geofence 708 through 712 and/or other information associated the map 700 are contemplated herein.

Figure 8:
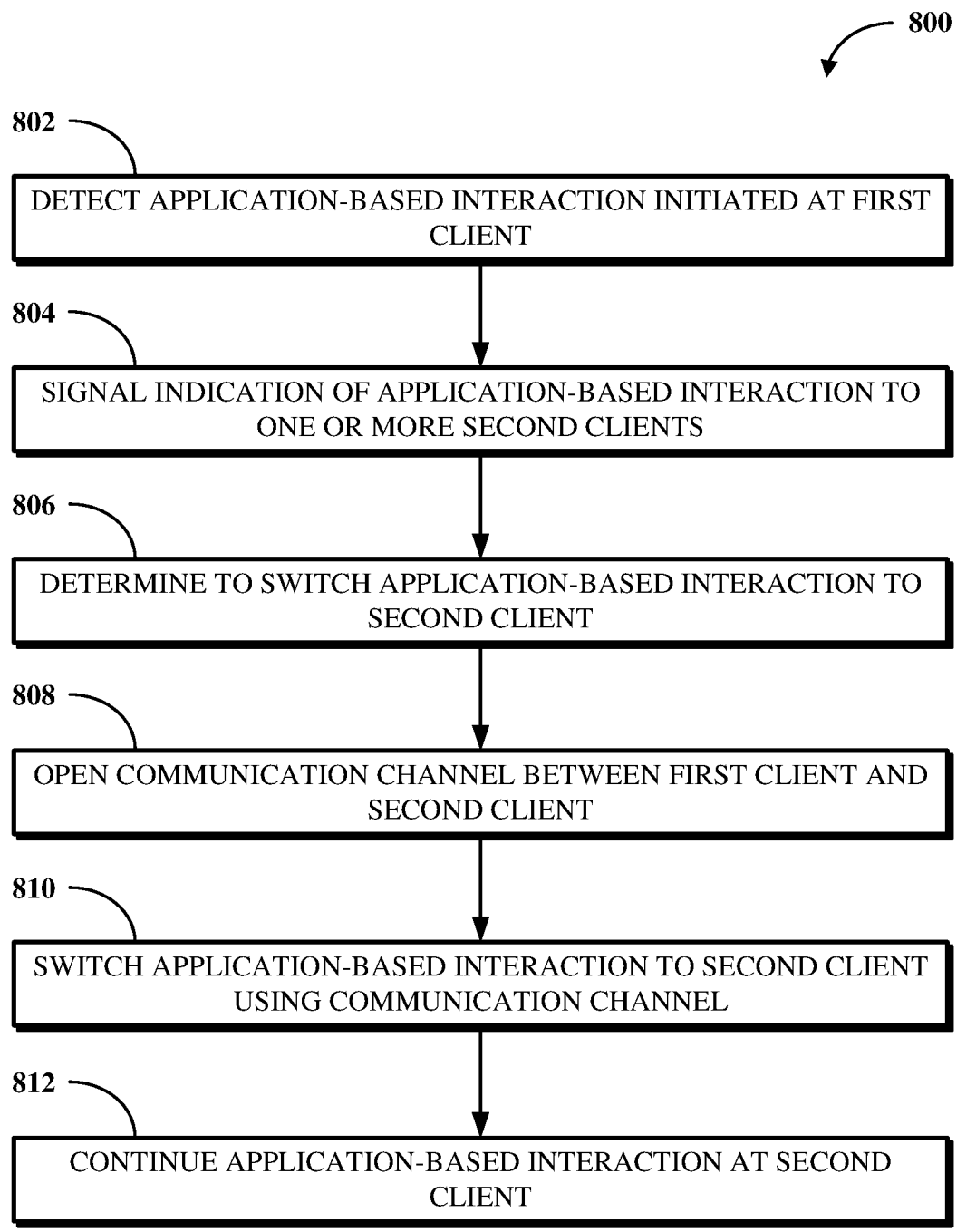
FIG. 8 is a flowchart of an example of a technique for application interaction movement between clients.

To further describe some implementations in greater detail, reference is next made to examples of techniques which may be performed by or using application interaction movement between clients. FIG. 8 is a flowchart of an example of a technique 800 for application interaction movement between clients. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, an application-based interaction initiated at a first client is detected. The application-based interaction is a phone call, an audio meeting, a video meeting, a chat conversation, or another interaction involving the operator and conducted through or otherwise using a software application. The application-based interaction may be detected by a software platform at which the first client is registered, for example, by an event message indicative of the application-based interaction being transmitted to or otherwise generated at the software platform. For example, the software platform can have visibility into usage of clients registered to it and software run in connection with it, in which use of such software at a registered client is known to the software platform.

The first client is a client for which use by an operator is pre-authenticated. For example, use of the first client by the operator may have been authenticated based on a client-side login (e.g., at the first client or another client) by the operator at a software platform before the application-based interaction at the first client is initiated. The first client may be a device for which the operator is the only authorized operator. Alternatively, the first client may be a shared device for which the operator is one of a number of authorized operators. In some implementations where the first client is a shared device configured for use by the operator and one or more other operators, the authentication of the operator for the first client may be responsive to verification by the operator at the first client. In one non-limiting example, the operator may be a human user associated with a customer of the software platform.

At 804, an indication of the application-based interaction is signaled to one or more second clients. In particular, the one or more second clients are other clients for which use by the same operator is also pre-authorized. For example, the pre-authorization may be based on client-side logins, at each of the respective second clients or other clients, by the operator at the software platform before the application-based interaction at the first client is initiated. Where the one or more second clients include a shared client configured for use by the operator and one or more other operators, the shared client can be authenticated responsive to a verification by the operator at the shared client.

Signaling the indication of the application-based interaction to the one or more second clients authenticated for use by the operator can include pushing an event message representative of the application-based interaction to some or all of the second clients. For example, the event message can be signaled to all of the second clients for which use by the operator is pre-authenticated. In another example, the event message can be signaled to a subset of the second clients, for example, those of a certain device type, those located within a certain location, or according to other criteria. The event message configures each of the second clients to be able to support the application-based interaction upon a switching of the application-based interaction from the first client to one of those second clients. The event message may, for example, be a push notification, a hypertext transfer protocol (HTTP) message (e.g., a HTTP post message), or anther notification or message.

At 806, a determination is made to switch the application-based interaction from the first client to the second client. The determination to switch the application-based interaction is based on one or more switching criteria associated with the second client. The switching criteria may, for example, correspond to a detection of the operator within a geofence associated with the second client and/or a verification by the operator to switch the application-based interaction to the second client. Regarding the verification, the operator may verify to switch the application-based interaction to the second client by interacting with software of the software platform. For example, the software can output a GUI to the first client or to another device associated with the operator in which the GUI includes one or more user interface elements. For example, the GUI can include user interface elements allowing the user to verify that the application-based interaction should be switched to the second client. In another example, the GUI can include user interface elements allowing the user to select the second client from a group of pre-authenticated clients of the operator.

Regarding the geofence, for example, at least some clients, including the first client and the second clients, may be associated with a geofence. The geofence may, for example, represent a defined area about a location of a client, which may be generally circular or of another shape. The operator may be detected within the geofence of a client, such as the second client, in one or more ways. In one example, the operator may be detected within the geofence of the second client based on a tracked location of the operator, such as using a location of a mobile device of the operator as tracked using a geolocation service (e.g., the global positioning system or a like service), cellular triangulation, or another tracking technique. The various geofences for clients can be associated with different places within a location at which the clients are located, for example, a premises of a customer of the software platform. Thus, the location of the operator may be cross-referenced against a location of the second client as indicated in a map of the location in which the second client is located.

In another example, the operator may be detected within the geofence of the second client based on an ultrasonic range of the second client. For example, the second client, along with at least some of other clients including the first client and the other second clients, may include an ultrasonic sensor configured to measure ultrasonic signals output from other clients or devices, including distances from respective ones of those other clients or devices to the ultrasonic sensor itself. Those distances, and thus the ultrasonic ranges of the respective clients, may be the same or may be different. For example, some ultrasonic ranges may be smaller or larger than others. The operator is detected within the geofence based on an ultrasonic range of the second client by an ultrasonic sensor of the second client detecting, at a measurable level, an ultrasonic signal output from another client or device, for example, the first client.

In some implementations, the operator or an administrator for the customer may configure aspects of one or more geofences, for example, defined areas thereof or operations to be performed upon detecting that an operator, such as the operator has entered or exited a geofence. In some implementations, detecting the operator within the geofence associated with the second client can include validating the location of the operator within the geofence. For example, in some cases, the operator may simply be passing through the geofence of the second client, but may not remain in that geofence for more than a transitory duration. Thus, in some such implementations, the software can detect whether the operator has been in the geofence for at least a threshold amount of time before effectively detecting the operator within the geofence.

In some implementations, the software can request that the operator verify to switch the application-based interaction to the client associated with the geofence. For example, the software can request the operator to verify that the operator is remaining within a location associated with the geofence. In some implementations, another type of handshake verification or other verification can occur to prevent a false positive in the form of the application-based interaction being switched to the client associated with the geofence, such as where that switching is not desired or intended.

At 808, a communication channel is opened between the first client and the second client. The communication channel is a digital pathway for connecting the first client and the second client over a network. The communication channel is opened by the software platform responsive to the determination to switch the application-based interaction from the first client to the second client. For example, the communication channel can be opened responsive to the operator verifying the determination to switch the application-based interaction from the first client to the second client. In another example, the communication channel can be opened responsive to a detection of the operator within a geofence associated with the second client.

At 810, the application-based interaction is switched from the first client to the second client using the communication channel. The application-based interaction is switched from the first client to the second client while the application-based interaction remains in progress. In particular, the application-based interaction is imported from the first client to the second client over the communication channel. Importing the application-based interaction can include causing a transmission of data indicative of the software used for the application-based interaction and data representative of the interactions by the operator and any other operators party to the interaction from the first client to the second client.

Once the application-based interaction has been switched from the first client to the second client, the communication channel between the first client and the second client is closed. In some implementations, the transmission may route through the software platform as an intermediary which receives the transmitted data from the first client and forwards it to the second client.

At 812, the application-based interaction is continued at the second client. The application-based interaction may be continued at the second client until the application-based interaction is terminated, for example, by the operator or another party to the application-based interaction terminating the application-based interaction (e.g., closing a chat or virtual meeting window, logging out of the software platform, etc.). In some implementations, a further switching of the application-based interaction may be performed to switch the application-based interaction from the second client to another client, such as back to the first client or to another one of the second clients, referred to as a third client. For example, one or more operations of the technique 800 may be repeated to cause a second switching of the application-based interaction, such as by opening a communication channel between the second client and the client to which the application-based interaction will be switched and then effecting the switching.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   detecting an inter-party communication at a first client based on an event message received from software used for the inter-party communication;
   receiving an indication to switch the inter-party communication to a second client responsive to pushing the event message to the second client;
   opening a channel between the first client and the second client responsive to an operator initiating switching the inter-party communication from the first client to the second client;
   switching the inter-party communication from the first client to the second client using the channel while the inter-party communication remains in progress; and
   continuing the inter-party communication at the second client.

2. The method of claim 1, the method comprising:
   pushing the event message to the second client based on use of the second client by the operator being pre-authenticated.

3. The method of claim 1, the method comprising:
   determining whether use of the second client by the operator is pre-authenticated.

4. The method of claim 1, wherein switching the inter-party communication from the first client to the second client using the channel while the inter-party communication remains in progress comprises:
   transmitting information usable by the second client to continue the inter-party communication to the second client over the channel.

5. The method of claim 1, the method comprising:
   determining that the second client is available for the switching based on the first client being within a geofence associated with the second client.

6. The method of claim 1, wherein the inter-party communication is a telephony communication, a virtualized meeting communication, or a messaging communication.

7. The method of claim 1, wherein the channel is a direct connection between the first client and the second client.

8. The method of claim 1, wherein the channel uses an intermediary to connect between the first client and the second client.

9. A non-transitory computer readable medium storing instructions operable to cause one or more processors to perform operations comprising:
   detecting an inter-party communication at a first client based on an event message received from software used for the inter-party communication;
   receiving an indication to switch the inter-party communication to a second client responsive to pushing the event message to the second client;
   opening a channel between the first client and the second client responsive to an operator initiating switching the inter-party communication from the first client to the second client;
   switching the inter-party communication from the first client to the second client using the channel while the inter-party communication remains in progress; and
   continuing the inter-party communication at the second client.

10. The non-transitory computer readable medium of claim 9, the operations comprising:
    storing a record indicating a pre-authentication of the second client by the operator prior to the inter-party communication; and
    while the inter-party communication is in progress, determining that use of the second client by the operator is pre-authenticated based on the record.

11. The non-transitory computer readable medium of claim 9, the operations comprising:
determining that the second client is available for the switching based on the first client being within a location associated with the second client.

12. The non-transitory computer readable medium of claim 9, the operations comprising:
transmitting information usable by the second client to continue the inter-party communication to the second client over the channel.

13. The non-transitory computer readable medium of claim 9, wherein the second client is a shared client.

14. A system, comprising:
a server running software configured to:
detect an inter-party communication at a first client based on an event message received from the software;
receive an indication to switch the inter-party communication to a second client responsive to pushing the event message to the second client;
open a channel between the first client and the second client responsive to an operator initiating switching the inter-party communication from the first client to the second client;
switch the inter-party communication from the first client to the second client using the channel while the inter-party communication remains in progress; and
continue the inter-party communication at the second client.

15. The system of claim 14, the system comprising:
a database storing a pre-authentication record for the second client, wherein the software is configured to:
determine that use of the second client by the operator is pre-authenticated based on the pre-authentication record.

16. The system of claim 14, wherein the software is configured to:
transmit information usable by the second client to continue the inter-party communication to the second client over the channel.

17. The system of claim 14, wherein the software is configured to:
determine that the second client as available for the switching based on the first client being identified within a geofence associated with the second client using a map of a premises.

18. The system of claim 14, wherein the channel connects the first client and the second client through the server as an intermediary.

* * * * *